(12) United States Patent
Moran

(10) Patent No.: US 8,108,303 B2
(45) Date of Patent: Jan. 31, 2012

(54) METHOD AND APPARATUS FOR HOME BUYERS LOAN APPROVAL VALIDATION

(76) Inventor: William Moran, Thousand Oaks, CA (US)

( * ) Notice: Subject to any disclaimer, the term of this patent is extended or adjusted under 35 U.S.C. 154(b) by 247 days.

(21) Appl. No.: 12/572,197

(22) Filed: Oct. 1, 2009

(65) Prior Publication Data

US 2010/0042534 A1 Feb. 18, 2010

Related U.S. Application Data

(63) Continuation-in-part of application No. 11/710,115, filed on Feb. 22, 2007, now abandoned.

(60) Provisional application No. 60/776,166, filed on Feb. 22, 2006, provisional application No. 60/776,167, filed on Feb. 22, 2006.

(51) Int. Cl.
*G06Q 40/00* (2006.01)
(52) U.S. Cl. .......................................... 705/38; 705/35
(58) Field of Classification Search .................... 705/35, 705/38
See application file for complete search history.

(56) References Cited

U.S. PATENT DOCUMENTS

| | | | |
|---|---|---|---|
| 5,870,721 A | 2/1999 | Norris | |
| 6,324,524 B1 | 11/2001 | Lent et al. | |
| 7,016,866 B1 | 3/2006 | Chin et al. | |
| 7,089,503 B1 | 8/2006 | Bloomquist et al. | |
| 7,107,241 B1 | 9/2006 | Pinto | |
| 2001/0029482 A1* | 10/2001 | Tealdi et al. | 705/38 |
| 2002/0103669 A1* | 8/2002 | Sullivan et al. | 705/1 |
| 2003/0036996 A1* | 2/2003 | Lazerson | 705/38 |
| 2004/0054606 A1* | 3/2004 | Broerman | 705/27 |
| 2004/0138912 A1* | 7/2004 | Campbell | 705/1 |
| 2004/0199402 A1* | 10/2004 | Walker et al. | 705/1 |

FOREIGN PATENT DOCUMENTS

| | | | |
|---|---|---|---|
| KR | 2004-050191 | * | 6/2004 |
| KR | 2004050191 | | 6/2004 |
| WO | WO 02/11046 | * | 2/2002 |
| WO | WO0211046 | | 2/2002 |

OTHER PUBLICATIONS

FiNet.Com Appoints 30-Year Technology Veteran to Senior Vice President. (27 July). PR Newswire,1. Retrieved Sep. 23, 2011, from Business Dateline. (Document ID: 43462774).*
Kim Renay Anderson. (May 1999). Two 'net firms form alliance. National Mortgage News, 23(34), 18. Retrieved Sep. 23, 2011, from Banking Information Source. (Document ID: 41367891).*

(Continued)

*Primary Examiner* — Sarah Monfeldt
(74) *Attorney, Agent, or Firm* — Connolly Bove Lodge & Hutz LLP; Billy A. Robbins

(57) ABSTRACT

A method for providing to a real estate purchaser such has a home buyer an indicia such as a printed card or an entry onto a portal signifying to those concerned in the industry such as a seller or a seller's representative that the home buyer has provided the information required for obtaining a loan, that the information including the financial information has been independently verified and has been processed through an appropriate approval process such as an automated underwriting system and has been approved for a predetermined loan amount and that the home buyer's condition is such that the loan is ready to close.

9 Claims, 19 Drawing Sheets

OTHER PUBLICATIONS

Gwendolyn Glenn. (May 1999). Finet offers 'first true' mortgage auction site. Real Estate Finance Today, 16(17), 10,13. Retrieved Sep. 23, 2011, from Banking Information Source. (Document ID: 41286359).*

GetSmart forges alliance with FiNet. (Jun. 1999). National Mortgage News, 23(41), 22. Retrieved Sep. 23, 2011, from Banking Information Source. (Document ID: 42924890).*

* cited by examiner

FIG. 3A

| Originating Lender Table (40) | | | | | |
|---|---|---|---|---|---|
| Company ID (key) | Company Name | Company Address | Company Phone | Company Status | Company Contact |
| 401 | 402 | 403 | 404 | 405 | 406 |

FIG. 3B

| Originating Lender Status Table (41) | | | | |
|---|---|---|---|---|
| Company ID (key) | Company Status | Company Approved | Company Current | Company Verified |
| 401 | 405 | 413 | 414 | 415 |

FIG. 3C

| Originating Lender Info Table (42) | | | | | | | |
|---|---|---|---|---|---|---|---|
| Company ID (key) | Company User ID (key) | Company User Name | Company User Address | Company User Phone | Company User E-mail | Company User Status | Company User Verified |
| 401 | 421 | 422 | 423 | 424 | 425 | 426 | 427 |

FIG. 3D

| Originating Lender AU Table (43) | | | | | | | | |
|---|---|---|---|---|---|---|---|---|
| Company ID (key) | User ID (key) | Company AU ID (key) | Company AU Account | Company User AU Account | AU Address | AU Phone | AU E-mail | AU Contact |
| 401 | 421 | 431 | 432 | 433 | 434 | 435 | 436 | 437 |

FIG. 3E

| Originating Lender Feedback Table (44) | | | | | | |
|---|---|---|---|---|---|---|
| Company ID (key) | Company User ID (key) | RTC User ID (key) | RTC User Verified | RTC User Feedback for Company User | Combined Company User Rating Totals | All Company User Totals Combined For Company Rating |
| 401 | 421 | 501 | 512 | 443 | 444 | 445 |

FIG. 3F
Originating Lender - Figure 3A table
- 401: Company's Unique Identifier
- 402: Company's Name
- 403: Company's Address
- 404: Company's Primary Phone
- 405: Company's status *(from 41)*
- 406: Company's Contact *(main contact information for company)*

FIG. 3G
Figure 3B — Originating Lender Status
- 401: Company's Unique Identifier
- 412: Company's Status *(combination of positives of 413. 414, 415)*
- 413: Company's Approval Status *(if company is RTC approved)*
- 414: Company's Current *(if company/RTC account paid & current)*
- 415: Company Verified *(correct session info. username, password)*

FIG. 3H
Figure 3C — Originating Lender Info
- 401: Company's Unique Identifier
- 421: Company User's Unique Identifier *(Loan Officer's unique ID. tied to Company's l.D.)*
- 422: Company User's Name
- 423: Company User's Address *(if different from main Company's)*
- 424: Company User's Phone *(if different from main Company's)*
- 425: Company User's B-mail
- 426: Company User's status *(Company status, user status in combination)*
- 427: Company User Verified *(correct session info, username, password)*

FIG. 3I
Figure 3D — Originating Lender's AU Info
- 401: Company's Unique Identifier
- 421: Company User's Unique Identifier
- 431: Company's AU Unique Identifier *(note. may be multiples)*
- 432: Company's AU Account number
- 433: Company's User's Individual User's Information *(to login as that user for data from AU)*
- 434: AU's address
- 435: AU's phone
- 436: AU's E-mail
- 437: AU's Contact

FIG. 3J
Figure 3E - Originating Lender's Feedback
- 401: Company's Unique Identifier
- 421: Company User's Unique Identifier *(Loan Officer)*
- 501: RTC User Unique Identifier *(RTC Cardholder)*
- 512: RTC User Verified *(to insure the feedback is from a valid RTC cardholder)*
- 443: RTC User Feedback for Company User *(individual loan feedback)*
- 444: Combined Company User Ratings Total *(summary of all loan feedback for Company User)*
- 445: Combined All User Rating Totals for Company Rating

FIG. 3K

RTC Homebuyer
Status Table (51)

| Homebuyer ID (key) | Homebuyer Status | Homebuyer Verified | Homebuyer Current |
|---|---|---|---|
| 501 | 513 | 512 | 523 |

FIG. 3L

RTC Homebuyer
Table (52)

| Homebuyer ID (key) | Homebuyer First Name | Homebuyer Last Name | Homebuyer Current Address | Homebuyer Home Phone | Homebuyer E-mail | Homebuyer RTC Card Number | Homebuyer Loan Number |
|---|---|---|---|---|---|---|---|
| 501 | 502 | 503 | 504 | 508 | 511 | 520 | 522 |

FIG. 3M

RTC Homebuyer
AU Info Table (53)

*(note: use table 43 if using Originating Lender)*

| AU Company ID (key) | Homebuyer AU Account | AU Address | AU Phone | AU E-mail | AU Contact |
|---|---|---|---|---|---|
| 431 | 524 | 434 | 435 | 436 | 437 |

FIG. 3N

RTC Homebuyer
Figure _3K RTC Homebuyer Status
    501: RTC 1-Iomebuyer's Unique Identifier
    513: RTC Homebuyer's Status *(combination of 312, 524)*
    512: RTC Homebuyer Verified *(correct session info, username, password)*
    523: RTC Homebuyer Current *(information current, account paid)*

FIG. 3O

Figure 3L RTC Homebuyer Info
    501: RTC Homebuyer's Unique Identifier
    502: RTC Homebuyer's First Name
    503: RTC Homebuyer's Last Name
    504: RTC Homebuyer's Address
    508: RTC Homebuyer's Home Phone
    520: RTC Homebuyer's RTC Card Number
    522: RTC Homebuyer's Loan Number

FIG. 3P

Figure 3M - RTC Homebuyer AU Info
    431: AU Company ID
    525: Homebuyer AU Account
    434: AU's address
    435: AU's phone
    436: AU's E-mail
    437: AU's Contact

FIG. 3Q

RTC Property Seller
Status Table (61)

| Property Seller ID (key) | Property Seller Status | Property Seller Verified | Property Seller Current |
|---|---|---|---|
| 601 | 613 | 621 | 634 |

FIG. 3R

RTC Property Seller
Table (63)

| Property Seller ID (key) | Property Seller First Name | Property Seller Last Name | Property Seller Property Address | Property Seller Home Phone | Property Seller E-mail |
|---|---|---|---|---|---|
| 601 | 602 | 603 | 604 | 608 | 611 |

FIG. 3S

RTC Property Seller
Property Info Table (63)

| Property Seller ID (key) | Property Seller Property Address | Property Title Report | Title Report Company Info | Property Inspection Report | Property Inspection Company Info |
|---|---|---|---|---|---|
| 601 | 604 | 631 | 632 | 633 | 634 |

| Property Termite Report | Termite Report Company Info | Property Appraisal | Appraisal Company Info |
|---|---|---|---|
| 635 | 636 | 637 | 638 |

FIG. 3T

RTC Homebuyer
Figure 3Q RTC Homebuyer Status

601: RTC Property Seller's Unique Identifier
    613: RTC Property Seller's Status *(combination of 312, 524)*
    621: RTC Property Seller Verified *(correct session info, username, password)*
    623: RTC Property Seller Current *(information current, account paid)*

FIG. 3U

Figure 3R  |– RTC Property Seller Info
        601 : RTC Property Seller's Identifier
        602: RTC Property Seller's Name
        603: RTC Property Seller's Name
        604: RTC Property Seller's Property Address
        608: RTC Property Seller's Home Phone
        611: RTC Property Seller E-mail

FIG. 3V

Figure 3S  – RTC Property Seller Property Info
        601 : Property Seller's Unique Identifier
        604: Property Address
        631: Property Title Report
        632: Title Report Company Info *(note: complete table with verifications, address, contact, status, etc.)*
        633: Property Inspection Report
        634: Inspection Report Company *(note: complete table with verifications, address, contact, status,*
            *etc.)*
        635: Property Termite Report
        636: Termite Report Company Info *(note: complete table with verifications, address, contact, status,*
            *etc.)*
        637: Property Appraisal
        638: Appraisal Company Info *(note: complete table with verifications, address, contact, status, etc.)*

Fig. 7

RTC Login
901

| | |
|---|---|
| Username: | 201 |
| Password: | 202 |

Sign In    230

Forget your Username and Password?          Help 231                                          232

(Update Information) Before you begin the verification process, please make sure your contact information is accurate.

| | |
|---:|:---:|
| Originating Lender: | 402 |
| Originating Lender Loan Officer First Name: | 422a |
| Originating Lender Loan Officer Last Name: | 422b |
| Originating Lender L.O. Business Phone: | 424 |
| Originating Lender A.U: | Select from List ⇩    431 |
| Client Loan Number: | 522 |
| Client RTC Card Number: | 520 |
| Client First Name: | 502 |
| Client Last Name: | 503 |
| Client Street Address: | 504 |
| Client City: | 505 |
| Client State: | 506 |
| Client Zip: | 507 |
| Client Home Phone: | 508 |
| Client Work Phone: | 509 |
| Client Mobile Phone: | 510 |
| Client E-Mail | 511 |

| Submit | To proceed to next step | | Reset | Reset Form |
|---|---|---|---|---|
| 471 | | | 472 | |

(Confirm Update Information)

The following information will be verified, check your information for accuracy before proceeding. You can correct any information by using the "BACK" button and modifying your information on the previous page.

| | |
|---:|:---:|
| Originating Lender: | 450 |
| Originating Lender Loan Officer First Name: | 451 |
| Originating Lender Loan Officer Last Name: | 452 |
| Originating Lender L.O. Business Phone: | 453 |
| Originating Lender A.U: | Select from List ⇩  454 |
| Client Loan Number: | 550 |
| Client RTC Card Number: | 551 |
| Client First Name: | 552 |
| Client Last Name: | 553 |
| Client Street Address: | 554 |
| Client City: | 555 |
| Client State: | 556 |
| Client Zip: | 557 |
| Client Home Phone: | 558 |
| Client Work Phone: | 559 |
| Client Mobile Phone: | 560 |
| Client E-Mail | 561 |

NOTE: By clicking the Submit button below, you acknowledge that your information as provided will be forwarded to a third party for additional verification. The additional information you provide in the upcoming process will be used by the third party for the sole purpose of verification of information. We will not receive any additional information.

| Submit | To proceed to next step | | Reset | Return to previous page to make corrections. |
|---|---|---|---|---|
| | 562 | | | 563 |

| ID Data Verification Updating Confirmation | Contratulations <br><br> You successfully completed the verification process. <br><br> RTC VERIFIED |
|---|---|

| ID Data Verification Updating Confirmation | Error in verification or confirmation. <br><br> There are errors in the data you submitted. Please try again or contact one of our service representatives. |
|---|---|

| Originating Lender Loan Officer Feedback (443) | Loan Officer Name:     Joe Smith (422)<br>Originating Lender:     Universal Lender (402)<br><br>Summary of Comments for Loan Officer (444)<br>             Past Month   Past Year   Lifetime<br>Positive      1          5          12<br>Neutral      1          0          2<br>Negative   0          1          1<br>Total        2          6          15<br><br>Summary of Comments for Originating Lender (445)<br>             Past Month   Past Year   Lifetime<br>Positive      4         20        54<br>Neutral      1          1          5<br>Negative   1          1          1<br>Total        6          22        60 |

METHOD AND APPARATUS FOR HOME BUYERS LOAN APPROVAL VALIDATION

CROSS-REFERENCE TO RELATED APPLICATION

This application claims the benefit of the prior filing date of U.S. Provisional Patent Application Nos. 60/776,166 filed Feb. 22, 2006 for Method and System for Home Buyer Loan Approval Process Validation Using the Worldwide Web and U.S. Provisional Patent application No. 60/776,167 filed Feb. 22, 2006 for Method And Apparatus For Home Buyers Loan Approval Validation, incorporated herein by reference in its entirety and is a continuation-in-part of U.S. patent application Ser. No. 11/710,115 filed Feb. 22, 2007 now abandoned and the benefit of the filing date thereof is hereby claimed.

FIELD OF THE INVENTION

The present invention relates to the field of real estate transactions and more specifically to independent verification of a home buyer including independent third party verified financial information status and verified real estate property conditions. The Ready to Close (RTC) process and issued indicia such as a printed card will serve to act as a standard as well as a central clearing point by which potential home buyers and sellers as well as their agents can verify the qualifications of a potential real estate purchaser such as a homebuyer, or the verified condition of the property for sale. The verification information may preferably come from a disinterested third party. This standard will assure the parties involved that the potential homebuyers making an offer to purchase a home of their eligibility in obtaining the required financing to complete the purchase, or that the home for sale has a clear title, is termite free, etc.

BACKGROUND OF THE INVENTION

For sellers of real estate properties it is vital to know the true third party verified ability of a potential buyer to obtain the necessary financing when they tender a contract and offer to purchase.

For buyers of real estate it is necessary to understand the true independently verified condition of the same property and evaluate said condition before tendering an offer and entering into a contract.
Current Traditionally, homebuyers find a home they like, obtain an accepted offer, then go to their mortgage lender, apply for a loan and hope to be approved. Many lenders have been offering to "pre-qualify" or "pre-approve" potential homebuyers before they start making offers on homes. Realtors who represent homebuyers will also suggest to a buyer they are working with in finding a home that they get "pre-qualified" or pre-approved".

Buyers often obtain an accepted offer with a contingency to obtain a written loan commitment within a certain time frame. Sellers want to avoid taking their home off the market only to find out the buyer cannot qualify for the new loan needed to complete the purchase. So they ask to see that the buyer has been pre-qualified or approved. In addition sellers will ask to see a buyer's credit report and/or ask how much they are putting as down payment towards their purchase. This information provides a false sense of security to a seller, and often is discriminatory to someone with less then perfect credit or who is putting little or nothing down, which has become common in recent years. Sellers often feel more secure with someone who is making a large down payment or has excellent credit. This often isn't reliable. In the height of the recent real estate boom many qualified buyers were unable to purchase a home because sellers were receiving multiple offers and would often take the offer where the buyer was making a larger down payment.

The terms "Pre-qualified" and "Pre-approved" are subjective terms and don't serve any real purpose other then to tell the interested parties that the potential buyers have spoken with a mortgage lender and that lender said they will qualify. In theory the pre-qualify and approval process is to perform a review of a loan application submitted by the homebuyer and include reviewing their credit as well as other documentation needed with the obvious exception of the property appraisal. The problem is no one knows exactly what steps the buyer has gone through and how closely the mortgage lender reviewed the buyer and what steps were used before issuing the Pre-qualify or approval letter. Often times these letters are typed up after only a casual conversation with a buyer and no reviews are done at all. The approval process involves the packaging of all required documentation which is then presented to an underwriter to make a final determination as to qualification for the particular loan program the borrower has requested. Currently there are several major underwriting systems used in the lending industry. Fannie Mae, the largest purchaser of single family residential home loans, offers the most common such system called Desktop Underwriter or DU. Fannie Mae sets the standard for much of the lending industry. One such example is the standard application of all lenders require today is a Fannie Mae Form 1003. Many lenders use the DU system even if the loan is not going to be sold to Fannie Mae. Freddie Mac offers the Loan Prospector application.

In addition to these underwriting systems, most major lenders allow for on-line status of loans that have been submitted to them for funding. After loans are approved through the automated underwriting system, documentation that supports the information entered into the AUS is sent to the underwriter who reviews it for accuracy. When the documents have been accepted the status of the loan is reflected back onto the lenders website.

Problems with current system:

Was a complete application taken or did the lender base their decision on verbal information provided by the Home Buyer?

Has the loan been entered into an Automated Underwriting System (AUS)?

Has an underwriter verified the supporting documentation?

Was the credit report reviewed?

Was the information on the application verified?

Currently, there is no way for an interested party, in particular a seller or his representative, to know these things except to ask for a letter from the potential lender. It's not uncommon for lenders to issue these letters without actually verifying all the pertinent information from a borrower or entering the loan into an automated underwriting system.

In summary, there is currently no way for the seller of a home to understand a buyer's true ability to obtain the necessary financing to purchase a home. The purpose of the present invention is to provide a standard through independent verification of the buyer's financial capability to repay the loan which can be relied upon in the industry.

When a purchase price and other terms are agreed upon the buyer then completes the process of obtaining financing and the seller provides to the buyer necessary disclosure as applicable by national and state law. The buyer is also given time to make their own investigations and his lender requests an appraisal of the property to be completed to determine the value with regards to lending. Other reports such as a termite inspection and title report are done during this period often referred to as "escrow" or "under contract." The buyer's acceptance of these and other reports is necessary for consummating of the loan transaction. The review of anyone of these reports can cause a buyer to withdraw from the transaction or cause a renegotiation.

In addition to verifying a borrowers ability to close by issuing the RTC indicia (Part 1) the RTC method will also allow the sellers of properties who have performed these inspections and generated the necessary reports to have them posted to a secure website within the RTC system. This will allow for potential buyers to view the reports therefore allowing the buyer to accept them prior to going under contract and thus eliminating the possibility of a cancelled or renegotiated contract. These reports can be viewed by anyone entering the RTC method website or the seller can choose to only allow viewing to potential buyers who have been validated as being approved by the RTC system.

When both sellers and buyers choose to participate in the RTC system, the transaction will be able to close much quicker and with much more certainty. However, it is not necessary for all parties to participate.

Example: Seller can participate and not buyer. The buyer still benefits from having access to more information before tendering a contract to purchase. The seller benefits by knowing the buyer has reviewed the necessary reports and disclosures and accepts the same.

Buyer can participate and not seller. The seller benefits as a result of knowing they have a qualified buyer. The buyer benefits as a result of having the financing in place and being able to offer a stronger verified offer.

SUMMARY OF THE INVENTION

The method of verifying the loan approval for a purchaser of real estate such as a home comprising the steps of obtaining documentation from the purchaser relating to the information required by a lender to process a loan; independently verifying the documentation provided by the purchaser; entering the documentation into an automated underwriting system; processing the information and issuing to the purchaser an indicia guaranteeing to the concerned parties that the loan has been processed and issued for closing.

In addition, a method and apparatus for sellers to verify a buyer's ability to obtain financing in a transaction and buyers to verify the condition of property prior to tendering an offer to purchase and contract in a network based facility. In one manifestation, the personal information of buyers or the property information of the seller is passed to a third party for independent verification via a communications network. The necessary reports and disclosures are passed through the third party for verification and then sent via the communications network for the buyer/seller to view prior to tendering or accepting a contract and offer to purchase.

It will be advantageous to provide participants the opportunity to have secure, verified and accurate easily accessible information concerning the buyer, the seller, or both.

BRIEF DESCRIPTION OF THE DRAWINGS

The present invention is demonstrated by way of representation and not restriction in the figures of the accompanying drawings, in which like references indicate similar elements and in which:

FIG. 1a is a block diagram illustrative of one manifestation of a network based transaction facility in accordance with the principles of the present invention;

FIGS. 3a through 3k are diagrammatic representations of one manifestation for the database tables for originating lenders, home buyers, and property sellers followed by a brief description of each element of the tables;

FIG. 7 is a model manifestation of a client login interface;

FIG. 8a is a model manifestation of an update information user interface;

FIG. 8b is a model manifestation of an update information confirmation interface;

FIG. 8c is a model manifestation of an update data success interface;

FIG. 8d is a model manifestation of an update data error interface;

FIG. 9 is a model manifestation of an Originating Lender Loan officer feedback table.

DETAILED DESCRIPTION OF THE INVENTION

The overall purpose of the present invention is to provide to the real estate purchaser such as a Home Buyer an indicia which for purposes of this initial description will be referred to as a Ready-To-Close Card or RTC Card which the Home Buyer can present to a seller or a seller's representative. The RTC Card is an indicia signifying to the seller or the seller's representative that the Home Buyer has gone through a bona fide loan approval process and has been approved for a predetermined loan amount and so long as the loan required to purchase the home, is within that approved amount, the Home Buyer is in a condition such that the transaction of the sale and purchase of the home is in a condition where it is "ready to close." The RTC card is a standard that guarantees to those concerned that the purchaser's financial information has been independently verified and that the purchaser can repay the loan.

Figure 1:
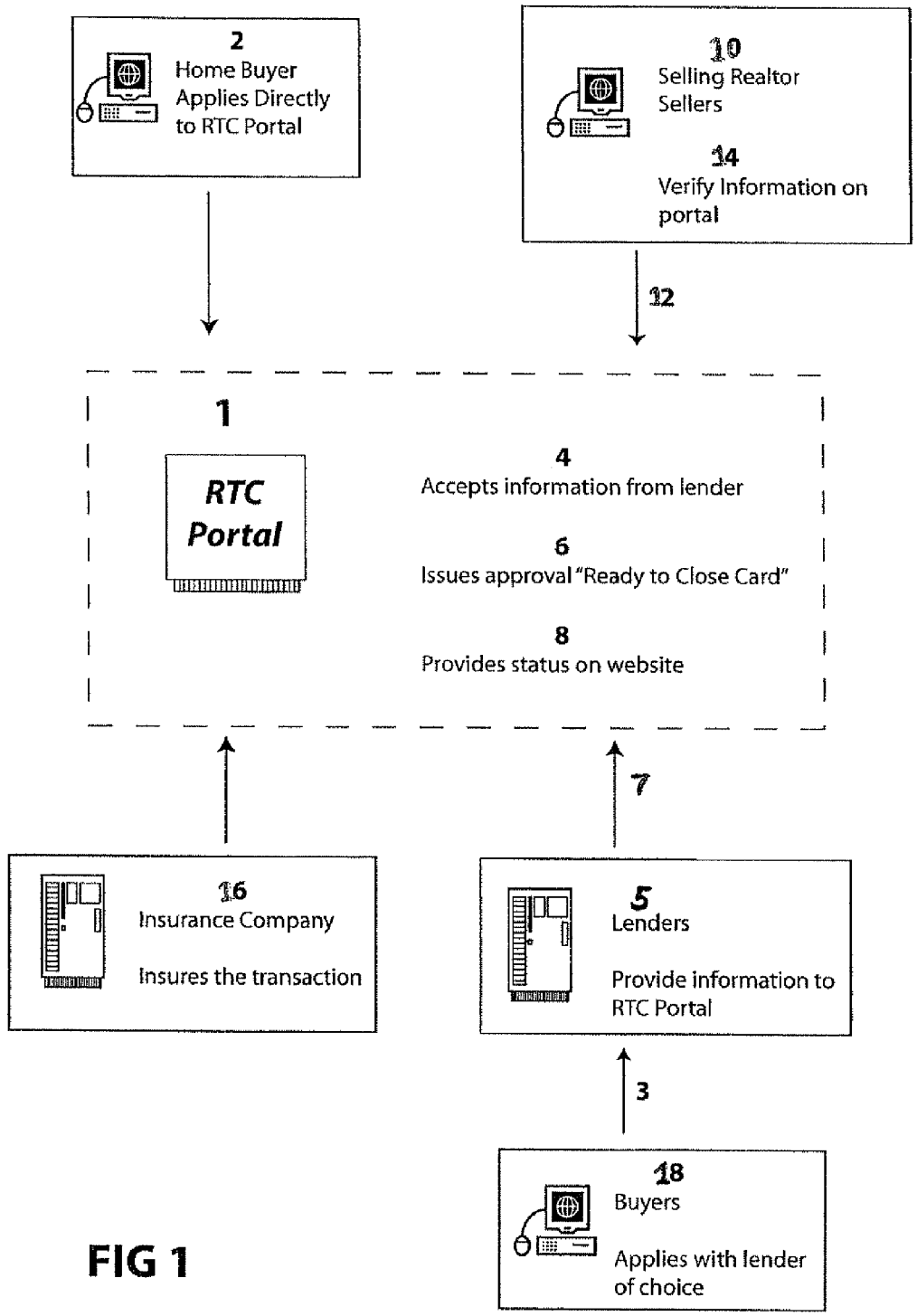
FIG. 1 represents, generally in block form, a system for carrying out the method of present invention.
Figure 1:
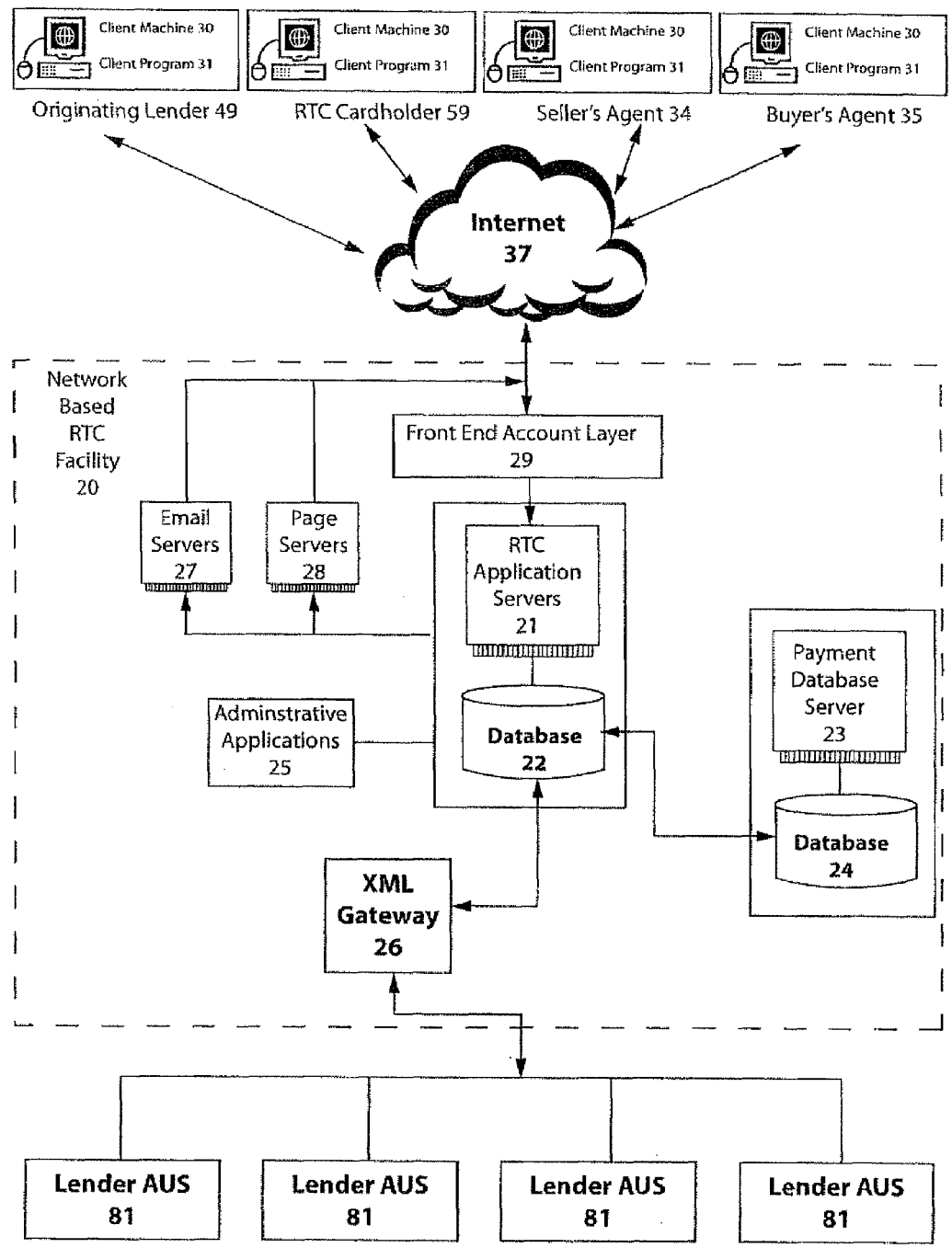

As is illustrated in FIG. 1, there is provided a RTC Portal 1. The Portal 1 is designed to accept information from the Home Buyer. As is indicated at 2, the Home Buyer may apply directly to the RTC Portal for approval of a loan of a predetermined amount to be used to purchase a home. In making this application, the Home Buyer provides data of the type normally required for loan approval. Such data would be typically name, address, social security number, marital status, employment information, income and monthly expense information as well as a description of assets and liabilities. The RTC Portal also requests backup information to validate data provided by the home buyer, such for example, as W-2 forms, paycheck stubs, tax returns, financial statements and the like. That information would be accepted by the RTC Portal as indicated at 4. The RTC Portal then processes the information, typically by using an AUS, and determines whether or not the loan requested by the Home Buyer is approved or denied, or alternatively, would provide information as to the amount of loan which is approved. When the processing occurs and the approval is issued as illustrated at 6, the RTC Portal issues an RTC Card which can then be utilized by the Home Buyer in the purchase of the home. As is also indicated at 8, the information concerning the RTC Card and the fact that the Home Buyer has been approved for a loan of a pre-determined amount is then posted on the RTC website, which is a secure website that can then be accessed by authorized individuals.

After the Home Buyer receives the RTC Card the Home Buyer may then seek out a home which is desirable. The Home Buyer would then negotiate with the seller or the realtor representing the seller as indicated at 10 to purchase the home. As part of the negotiating process, the Home Buyer would present the RTC Card to the seller or the seller's realtor, agent or other representative indicating the Home Buyer is in a "ready to close" situation. The seller or the seller's representative may then access the RTC website as shown at 12 for the purpose of verifying the information represented on the RTC Card as is illustrated at 14. It is contemplated that the seller's representative will have registered with the RTC Portal and received an appropriate password to access and log on to the website.

As part of the overall process, an insurance company 16 may be involved in processing the Home Buyer's application for the RTC Card. The insurance company will, upon the information provided by the Home Buyer being appropriately processed, validated and approved, and the RTC Card being approved, insure the transaction so that any seller or seller's representative will have complete assurance that the transaction as negotiated between the Home Buyer and the seller will be closed, since the loan amount referenced on the RTC Card is effectively guaranteed by the insurance company 16 the insurance company would be willing to guarantee the loan because it knows that the financial information of the buyer has been independently verified as guaranteed by the standard identified by the RTC Card.

As an alternative to the Home Buyer accessing the RTC Portal and applying directly for the RTC Card, the Home Buyer may go to a lender of the Home Buyer's choice as shown at 18, 3 and 5 and make application for a loan. The lender would then obtain the information as above discussed required to process the loan. The information required would be that as referred to, for example, on Fannie Mae Form 1003 or Freddie Mae Form 65, Universal Residential Loan Application which are the same. Such loan applications are readily available and by this reference are incorporated herein. Alternatively, the lender may have its own residential loan application for use in such a transaction. In any event, once the information is obtained, it is transmitted as shown at 7 to the RTC Portal. There may be a plurality of lenders that the Home Buyer may approach, each of which would have access to the RTC Portal. Typically such lenders must register with the RTC Portal and have received an appropriate password to be able to obtain access to it and log on for the purpose of obtaining an RTC Card for Home Buyers who make application to the lenders. Once the information is submitted, the RTC Portal processes the information as above described, and if the loan application is approved and the financial information is independently verified, would issue the RTC Card as shown at 6, which could then be used by the Home Buyer to approach the seller or the seller's representatives as above described.

There will now be disclosed a method and apparatus for verifying a buyer's ability to obtain financing and a seller's representation of the condition and disclosure of property, in a network based facility. In the following depiction, for the intent of elucidation, numerous specific details are set forth to aid in imparting a thoroughgoing comprehension of the present invention. It will be evident to one practiced in the current state of technology that the present invention may be carried out with alternatives to these specific details without departing from the scope of the present invention as defined by the claims.

Terminology

For the purposes of this explanation the term transaction shall be taken to include any communications between two or more entities, but not limited to real estate and can be used for a wide variety of transactions that typically require the buyer to obtain financing and the seller to make certain representations and/or warranties regarding the property which is the subject matter of the transaction.

Transaction Facility

FIG. 1*a* is a block diagram illustrating a representative network-based transaction facility in the construct of an Internet based real estate financing verification facility. This demonstrates the major components of the method and apparatus, variations may exist. It will be evident to one practiced in the current state of technology that the present invention will find relevance in many different versions of digital communication devices and network based transaction facilities requiring independent third party verifications.

The transactional facility, network based RTC Facility 20, includes one or more of various types of servers. In the example illustrated are front end servers, such as page servers (28) for the delivery of web pages (e.g. markup languages, HTML, XHTML, XML), E-mail servers (27) for automated communications with users of the facility, and a Front End Account server (29) for preliminary user log on and account verification.

The back-end servers include the main RTC Application server (21) which maintains and facilitates access to its database (22), a payment server (23) and its related database (24), administrative servers (25), and XML gateway servers for interfacing with independent third party automated underwriting systems (AUS) systems (81).

The method and apparatus male use of the public Internet and may be accessed with a variety of client machines (30) using a web enabled browser (31 e.g. Internet Explorer, Firefox, Opera) able to access the Internet and display the required information. These client machines may for example be the originating lender 49, the home buyer RTC cardholder 59, the seller's agent 34 and the buyer's agent 35.

Database Structure

Figure 2:
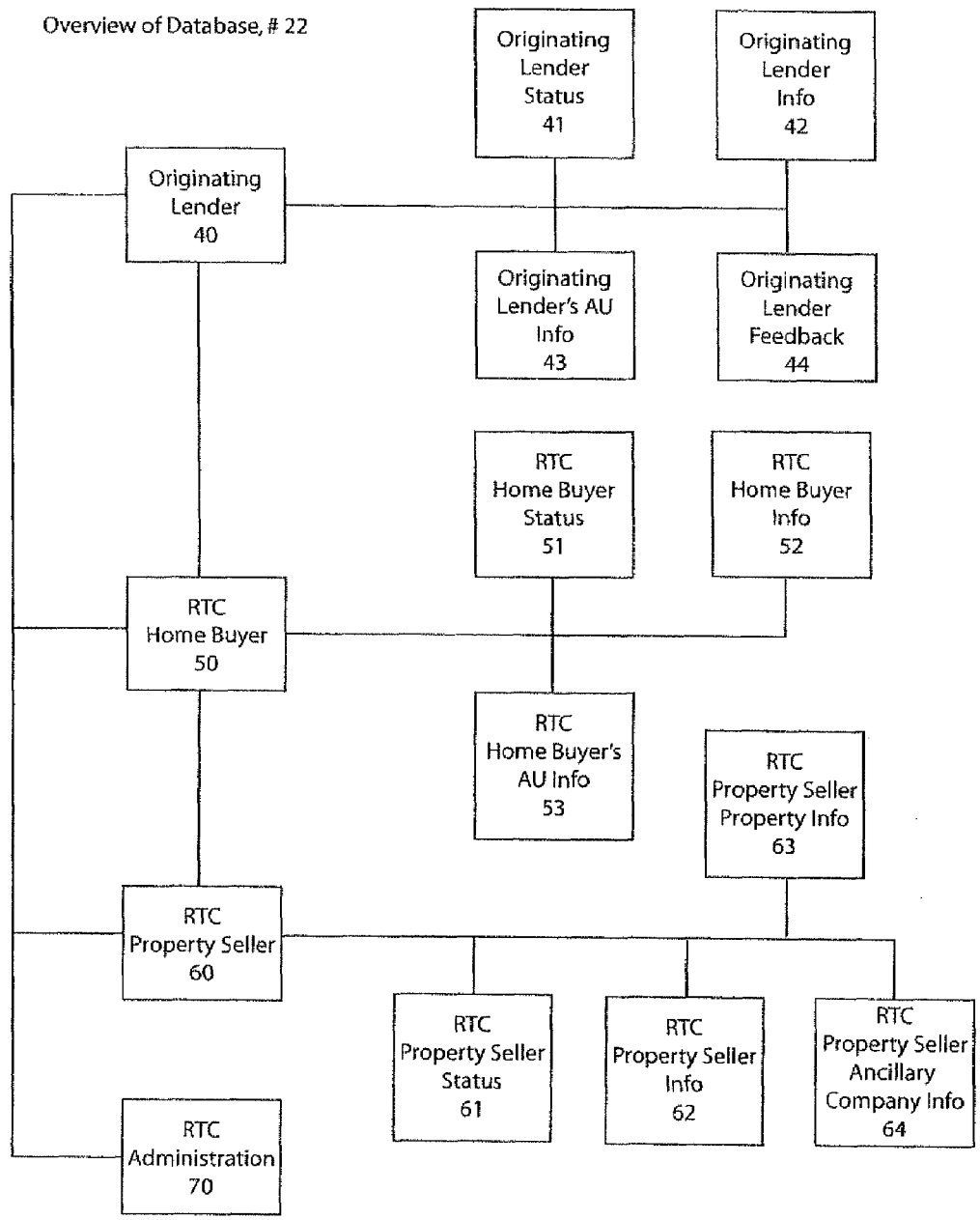
FIG. 2 is a block diagram of one manifestation of a database maintained by a database engine server.

FIG. 2 illustrates one manifestation of the RTC database (22) accessed and maintained by the RTC application servers (21). The database may be implemented as a relational database, which is linked by primary keys, and indices. In an alternative manifestation, the database (22) would be realized as a collection of objects in an object oriented database.

Originating lenders, RTC Home Buyers, and Property Sellers will normally be required to register to use the RTC system and website and will be issued a user identification and password.

Central to the database (22) are the 3 main user tables, the Originating Lender table (40), the RTC Home Buyer table (50), and the RTC Property Seller table (60), which contain records for each Originating Loan company, Originating Loan company user, RTC Home Buyer user, and RTC Property Seller user of the transaction facility (20). (The terms "home" and "property" are interchangeable.) In a relational database manifestation, each of the primary tables is related to secondary tables. In the Loan Originator manifestation, after registration, verification, and payment, the Loan Originator's data is stored for access on the Originating Lender table (40), with the primary Originating Lender key generated for unique identification, (FIG. 3a, 401) and other data pertinent to the company, Company Name (FIG. 3a, 402) Company Address (FIG. 3a, 403), Company phone, (FIG. 3a, 404), whether or not the company's status is in good standing or not (FIG. 3a, 405) and the company contact information (FIG. 3a, 406). This top level table is related via the primary key to the secondary tables. In this manifestation the Originating Lender status table (41, FIG. 3b) is used to generate the company's standing (FIGS. 3a, 3b, 405) by using whether or not the company has been registered and approved (FIG. 3b, 413) by the RTC Transaction Facility (20), the company's registration expiration/renewal status (FIG. 3b, 414), and the status of the verification of the Originating Lender registration and data, (FIG. 3b, 415). The Originating Lender User (e.g. loan officer) info table (42, FIG. 3c), the unique secondary key or identification for the individual Originating Lender user (FIG. 3c, 421) contact information for that individual user: address (FIG. 3c, 423), phone number (FIG. 3c, 424), E-mail (FIG. 3c, 425), the individual Originating Lenders user's standing status (FIG. 3c, 426), and the status of the verification for the Originating Lender's information (FIG. 3c, 427). The Originating Lender's Automated Underwriting Systems (e.g. AU) table (43), it's primary key (FIG. 3d, 431), and the information needed: Originating Lender Company's AU's account information (FIG. 3d, 432), Originating Lender Company User's account information (FIG. 3d, 433), AU's address, (FIG. 3d, 434), AU's phone (FIG. 3d, 435), AU's E-mail (FIG. 436), and AU contact information (FIG. 3d, 437) to be used by the XML gateway (26) to access the third party Lender AUS (81) for third party verification of the RTC Homebuyer's information (50). The Originating Lender Feedback Table (44), the combined unique keys for the individual transaction (FIG. 3e, 401, 421, 501) and the Originating Lenders User's feedback (e.g. positive, neutral, negative) for each individual transaction (FIG. 3e 443), Originating Lenders User's combined feedback totals (FIG. 3e, 444) and the Originating Lender's combined company feedback (FIG. 3e, 445). In combination, the Originating Lender Feedback tables will allow a logged in web user to view the opinions of verified clients who have used the Originating Lender in order to make a more informed choice. Other descriptive information may also populate the Originating Lender's Feedback table.

In the RTC Homebuyer manifestation, after registration, verification, and payment, the RTC Homebuyer's data is stored for access on the RTC Homebuyer table (50), with the primary RTC Homebuyer key generated for unique identification, (FIG. 3f, 501), the RTC Homebuyer's status (FIG. 3f, 513, combination of verified, 512, and current, 523), whether or not the RTC Homebuyer is verified (FIG. 3f, 521), if the RTC Homebuyer is current (FIG. 3f, 523) and other data pertinent to the RTC Homebuyer: RTC Homebuyer First Name (FIG. 3g, 502), RTC Homebuyer Last Name (FIG. 3g, 503) RTC Homebuyer Current Address (FIG. 3g, 504), RTC Homebuyer home phone, (FIG. 3g, 508), RTC Homebuyer E-mail (FIG. 3g, 511, RTC Homebuyer Card Number (FIG. 3g, 520), RTC Flomebuyer Loan Number (FIG. 3g, 522). Also, in the instance of the RTC Homebuyer not using an Originating lender, an RTC Homebuyer's AU table is implemented for the AU's data (53). Note that in one manifestation parts of the AU data are relationally stored in Originating Lender's AU Info table (43) to avoid replication of data sources. If the data is not present on the Originating Lender's AU Info table (43), it will be populated from the RTC Homebuyer's AU Info table (53), with the additional information of the RTC Homebuyers AU account number (FIG. 3h, 524), the AU company ID unique identifier key (FIG. 3h, 431), the AU Address (FIG. 3h, 434), AU phone (FIG. 3h, 435), AU E-mail, (FIG. 3h, 436), and AU contact information (FIG. 3h, 437).

In the RTC Property Seller manifestation, following registration, verification, and payment, the RTC Property Seller's data is stored for access on the RTC Property Seller table (FIG. 2, 60) with the associated unique identification key. In view of the fact that the data present on this table is fundamentally different, and furthermore that the verification procedures use a different confirmation structure, this expression of the data is at more of a variance than the previous two examples (FIG. 2, 40 & 50). FIGS. 3i through 3k are several demonstrations of the information that would be present in the current manifestation of the database. As with the previous examples, a Property Seller Unique Identifier Key would be created (FIG. 3i, 601), the Property Seller's Status (FIG. 3i, 613) would be generated using a combination of the data populated and analyzed from the Property Seller's Verification status (FIG. 3i, 621), and if the Property Seller is current (FIG. 31, 623). The Property Seller's pertinent contact information table (FIG. 2, 62) would include the Property Sellers First Name (FIG. 3j, 602), Last Name (FIG. 3j, 603) the property for sale's address (FIG. 3j, 604), and contact information in connection with the Property Seller, such as Property Seller Home Phone (FIG. 3j, 608), and Property Seller E-mail (FIG. 3j, 611).

It should be readily evident to one experienced in the craft of relational databases that the above process and data for the Property Sellers Table (FIG. 2, 60) with minor modifications, could be used for many other objects for sale that require third party verifications as part of the transaction process.

It should also be readily evident to one experienced in the craft of relational databases that the RTC Home Seller's Property Information Company's registration, company and contact information, plus the procedures for verification of the data concerning the property could be enumerated in greater detail than presently demonstrated.

The RTC Database (FIG. 1, 24) administrative supporting table (FIG. 2, 70) contains the tables needed for necessary administrative functions that need to cull data from the Originating Lender (FIG. 2, 40), RTC Homebuyer (FIG. 2, 50) and RTC Property Seller (FIG. 3, 60) tables. In the current manifestation such data flow could include automated responses to data that are date sensitive and the parties involved need to be updated to a potentially problematic situation before it occurs in a timely manner, verification issues, change of pertinent data that might effect the status of one or more of the parties involved, and other automated data current concerns. It would be appreciated to recognize the value of other data flows to which automated warnings, expiry concerns, and updates could be derived from the RTC Administrative database (FIG. 2, 70).

Identity Verification Process

To enhance the quality of trust between participants in the transaction facility (FIG. 1, 20), one manifestation of the invention proposes multiple levels of client verification and trusted third party verifications, with the results being available to other web users who have the proper credentials (e.g. loan number, RTC card number, client last name). This layered approach enables real time, web based reliable verification of pertinent data for a real estate transaction, or other objects that require third party verifications.

Figure 4:
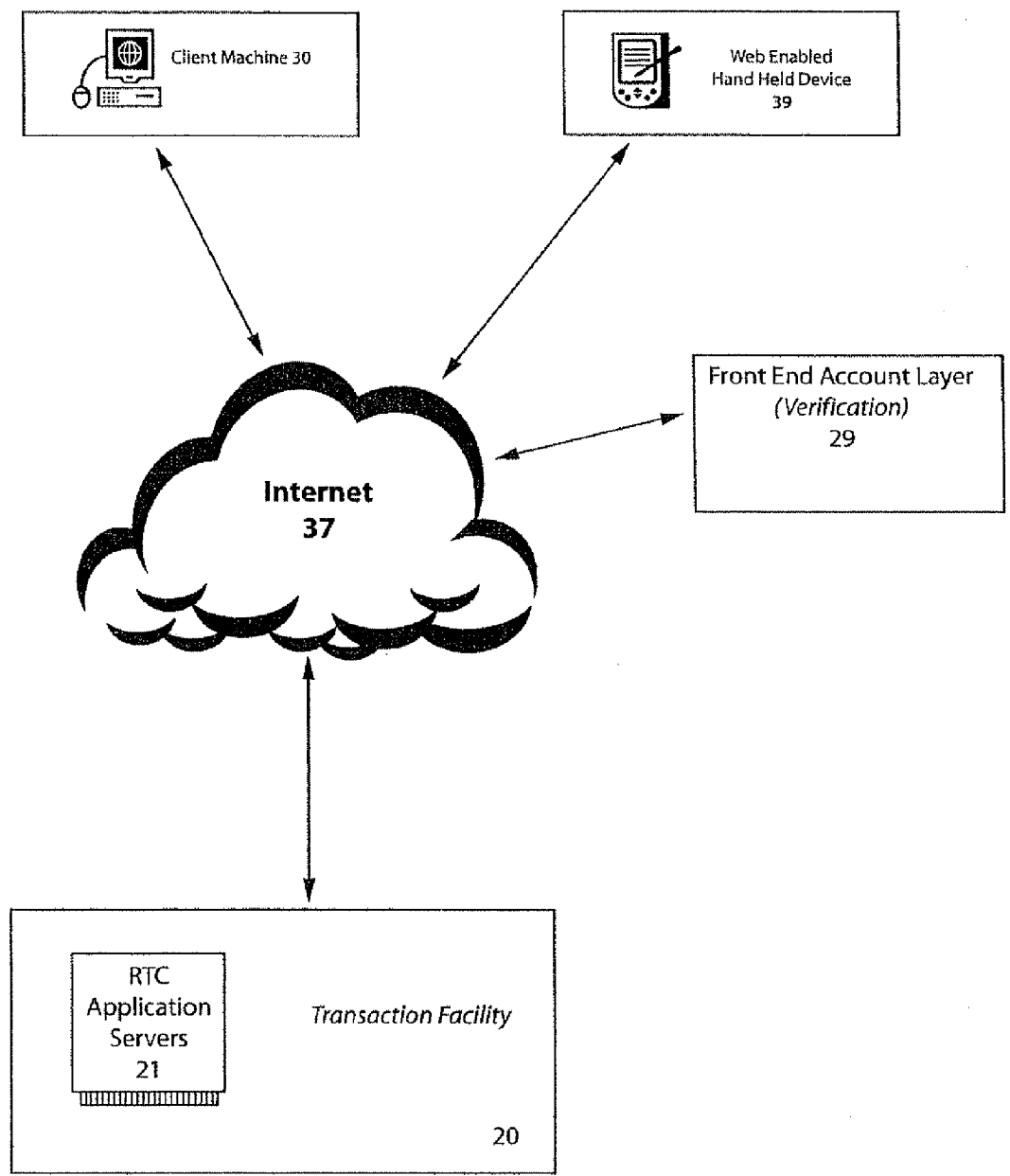
FIG. 4 is a block diagram of one manifestation for verifying the identity of a participant in the transaction facility.

FIG. 4 is a block diagram for verifying the identity of a participant, in one manifestation, that may be implemented by the transaction facility (FIG. 1a, 20). In this manifestation, the client computer (FIG. 1a, 30), which represents any of the users of the facility (20), is connected to the transaction facility (FIG. 1a, 20) and its servers via a communications network, in this manifestation the Internet (FIG. 1a, 37). The client computer (FIG. 1a, 30) is one manner in which users can participate in transactions with the transaction center (FIG. 1a, 20). Other methods that may be used include web enabled portable communication devices (FIG. 4, 39) (e.g. Blackberry handheld devices), In this environment, the client computer (FIG. 4, 30) presents the user (e.g. Real Estate Seller's agent) with an identity verification interface for obtaining the clients verified information (e.g. Real Estate Buyer). The client computer (FIG. 4, 30) receives the information, as detailed below, from the transaction facility (FIG. 1a, 20).

The application servers (FIG. 4, 21) which support the transaction facility (FIG. 1a, 20) handles all transactions between the various participants of the facility (FIG. 1a, 20), including the user of the client computer (FIG. 4, 30). The application servers (FIG. 4, 21) are coupled to a Front End Account layer (29). In this manifestation, the Front End Account layer (FIG. 4, 29) (e.g., identity verification) receives the personal information of the participant from the client computer (FIG. 4, 30), and performs an identity and status verification process based on the personal information, Loan Originator company and user information. Upon completion of the identity verification and status process, the Front End Account layer computer generates a verification and status result that is transferred back to the application servers (FIG. 4, 21) over the network (FIG. 4, 37).

The application servers (FIG. 4, 21) receives the verification result and makes it available, via the network (FIG. 4, 37), to the participants who wish to know this information on their client machine (FIG. 4, 30). In one manifestation, the application servers (FIG. 4, 21) issue an identity and status verification which is displayed with the participant's public information, In another manifestation the application servers (FIG. 4, 21) issue a more detailed report concerning the participant's RTC status, and whether or not the participant qualifies for a certain financial transaction. This data is in term transmitted via the network (FIG. 4, 37) to the client machine (FIG. 4, 30).

Figure 5:
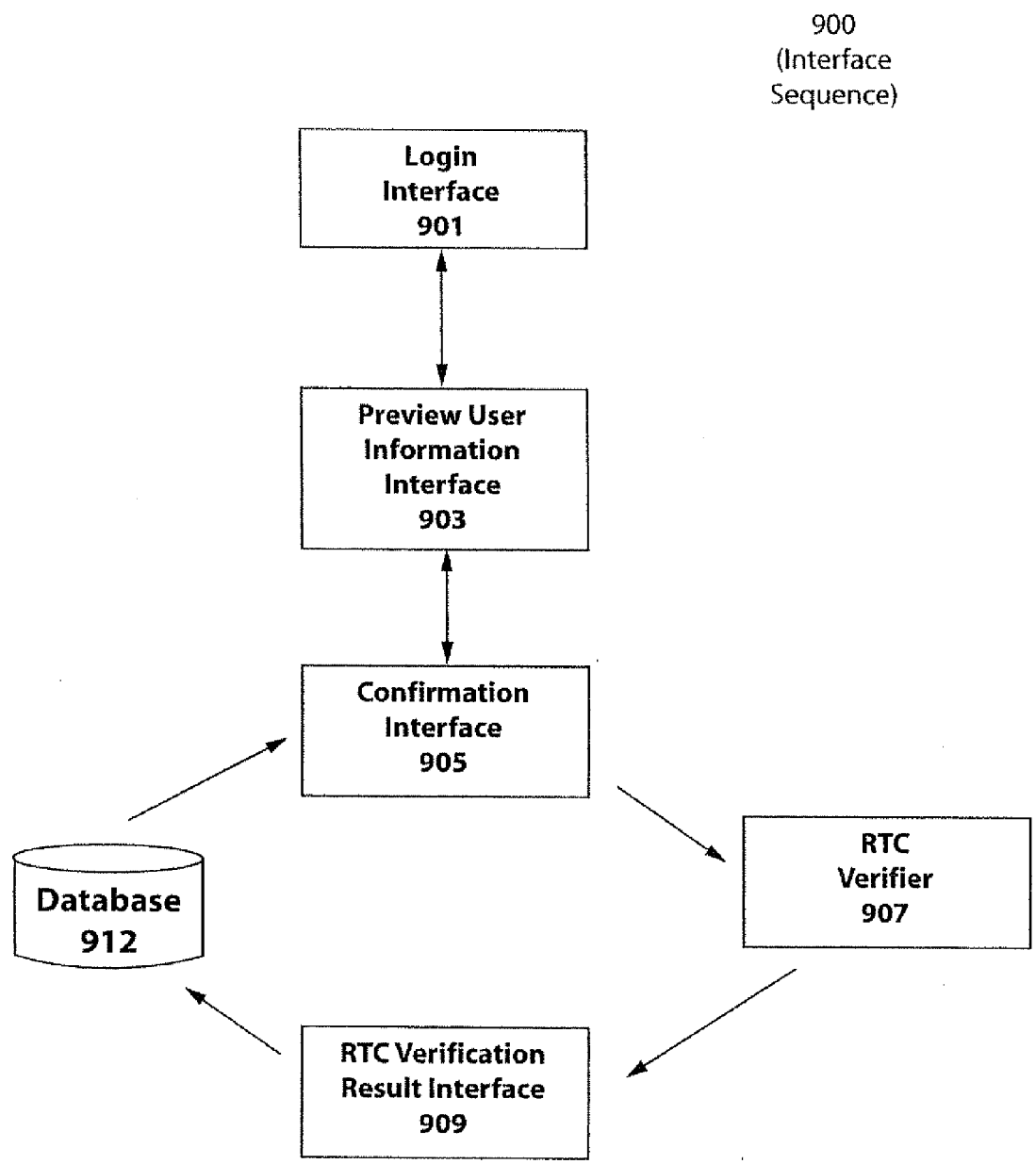
FIG. 5 is a block diagram of one manifestation of an interface sequence implemented to verify the identity of a participant.

FIG. 5 illustrates an interface sequence (900), according to one model manifestation of the present invention, that may be put into practice by the transaction facility (FIG. 1a, 20) for the intent of verifying the identity and status of a participant in the RTC transaction facility (FIG. 1a, 20). The sequence (FIG. 5, 900) of interfaces illustrated in FIG. 5 will be depicted with references to the model representations of the various interfaces with the sequence (FIG. 5, 900) in FIGS. 6a, 6b, 7, 8, 9.

The interface sequence (FIG. 5, 900) initiates with a login interface (FIG. 5, 901), whereby a user of the transaction facility (FIG. 1a, 20) provides at the minimum a user identifier and the associated password. In one manifestation extra login identifiers may be required above and beyond a user identifier and associated password. In addition, one manifestation provides information that a third party verifier is also included in the verification process.

The interface (FIG. 5, 901) and consequent interfaces, (FIG. 5, 903, 905, 909) are generated by a collection of methods (or objects). The login interface (FIG. 5, 901) is followed by a preview user information interface (FIG. 5, 903). The preview user information interface (FIG. 5, 903) is generated based on the user's personal and verified information stored in a database (FIG. 5, 912) (in one manifestation specifically in the Originating Lender table (FIG. 2, 40) and the Originating Lender Info table (FIG. 2, 42) and displays the user's personal information to the user. One example representation of this interface is shown in FIG. 8.

Figure 6A:
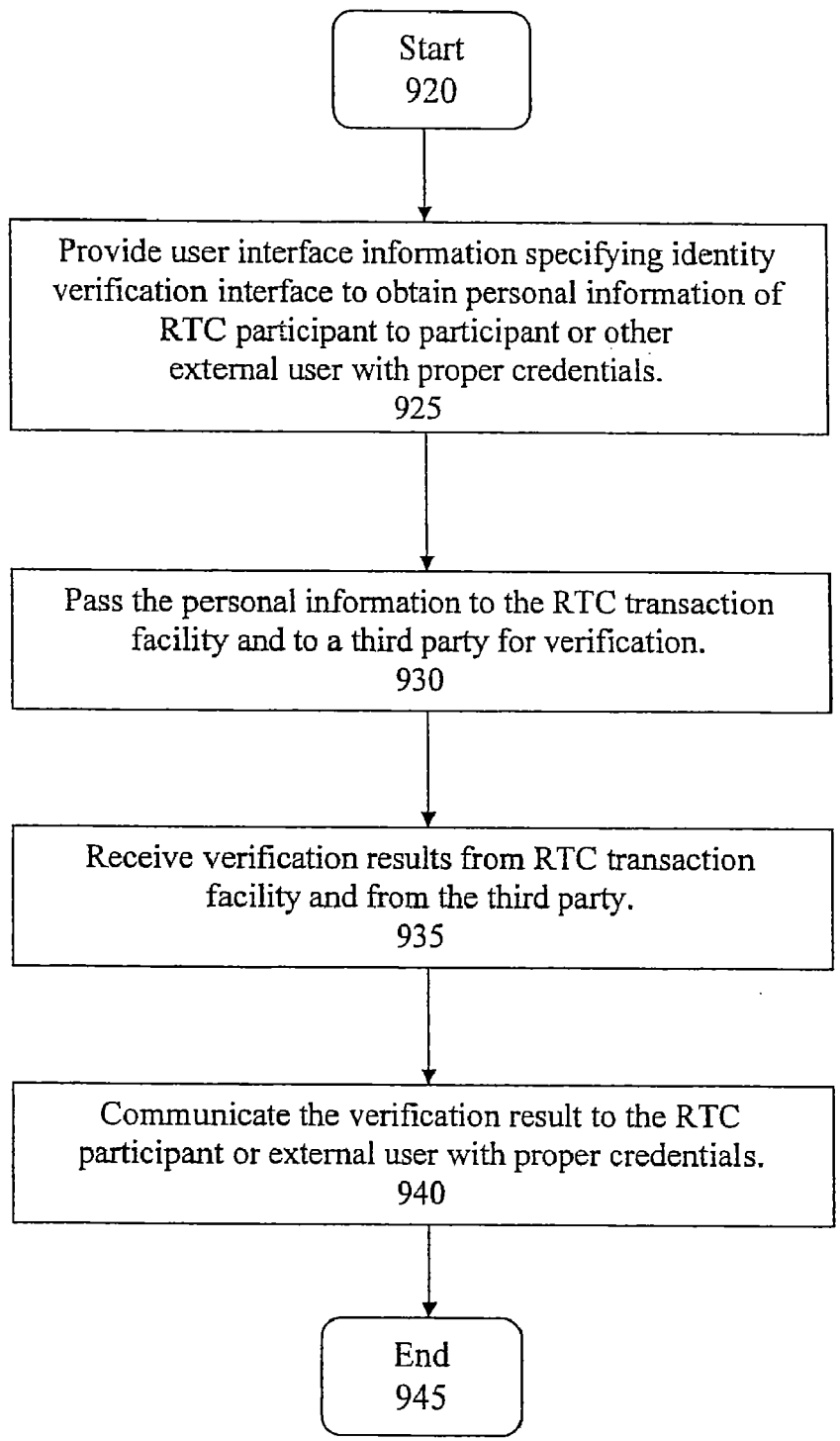
FIG. 6a is a flow chart of one manifestation for a method of verifying the identity of a participant in a network-based transaction facility.
Figure 6B:
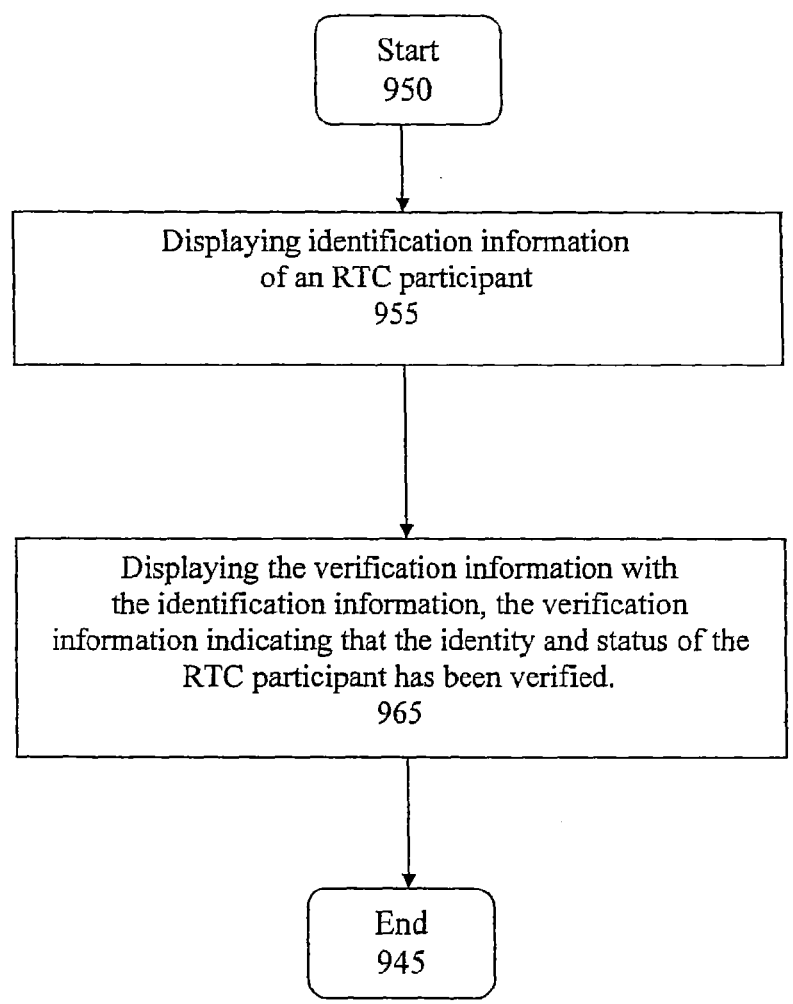
FIG. 6b is a flow chart of one manifestation for a method of displaying a user interface to verify identity of an RTC participant and status in a computerized transaction facility.

FIG. 6a demonstrates a manifestation of a log in procedure which could be used. The client at a local computer desktop (FIG. 1a, 30) using browser software (FIG. 1a, 31) and navigating to the RTC Client Log In start (FIG. 6a, 920) is presented with an interface requiring identity verification procedures (FIG. 6a, 925). This data is then securely transmitted encrypted via the TCP/IP Hypertext Transfer Protocol, Secure (HTTPS) (FIG. 1a, 37) to the RTC transaction facility (FIG. 1a, 20) and in some configurations to a third party (FIG. 1a, 81) for further verification (FIG. 6a, 930). The result of the log in procedure and verifications are then processed (FIG. 6a, 935), transmitted back, again via HTTPS, through the Internet (FIG. 1a, 37), to the client browser software (FIG. 1a, 31), and the client is then presented with the results of the login procedure (FIG. 6a, 940) at the end of this process (FIG. 6a, 945). FIG. 6b continues with the results of a successful login (FIG. 6b, 950), and displaying the identity information of an RTC participant (FIG. 6b, 955). Following that successful log-in with a request for further RTC data, the status of the RTC participant can then be viewed (FIG. 6b, 965), and the session can then be ended if desired (FIG. 6b, 945).

Referencing the manifestation of a login page exhibited in FIG. 7, the user is initially presented with the login interface (FIG. 7, 901), followed by a request for a unique login identifier (FIG. 7, 201), it's associated password (FIG. 7, 202), a sign in button (FIG. 7, 230) to initiate the logging on and verification process, a link for assistance to recover a lost or forgotten password (FIG. 7, 231), and a general assistance link (FIG. 7, 232).

Referencing the manifestation exhibited in FIG. 8a, the interface (FIG. 8a, 903) provides an opportunity to update the Originating Lender Company Name (FIG. 8a, 402), Originating Lender Loan Officer First Name (FIG. 8a, 422a), Originating Lender Loan Officer Last Name (FIG. 8a, 422b), Originating Lender Loan Officer Business Phone (FIG. 8a, 424), Originating Lender A.U. (FIG. 8a, 431), Client Loan Number (FIG. 8a, 522), Client RTC Card Number (FIG. 8a, 520), Client First Name (FIG. 8a, 502), Client Last Name (FIG. 8a, 503), Client Street Address (FIG. 8a, 504), Client City (FIG. 8a, 505), Client State (FIG. 8a, 506), Client Zip (FIG. 8a, 507), Client Home Phone (FIG. 8a, 508), Client Work Phone (FIG. 8a, 509), Client Mobile Phone (FIG. 8a, 510), Client E-mail (FIG. 8a, 511). All fields, with the notable exception of the RTC Card Number, are editable and can be changed by the user if incorrect or outdated. After making the necessary corrections, the user confirms the information using the submit button (FIG. 8a, 471). In case of user error, a reset button (FIG. 8a, 472) is also present.

Returning to FIG. 5, a confirmation interface (FIG. 5, 905) is displayed to the user consequent to the user posting the data using the submit button (FIG. 8a, 471) on the preview interface (FIG. 5, 903). The confirmation interface (FIG. 5, 905) displays the user's personal information (as modified by the user on the preview user information interface (FIG. 8a, 903) to give the user a last chance to modify the personal information before submitting it to transaction facility verification objects/methods (FIG. 5, 907). The information submitted by the user will be independently verified and such may be done through the use of an independent third party (FIG. 6a, 930).

A model representation of the confirmation interface is shown in FIG. 8b. This confirmation interface (FIG. 5b, 905) presents a submit button (FIG. 8b, 562), and a back button (FIG. 8b, 563) in case further changes are necessary. By clicking on the submit button (FIG. 8b, 562), the user acknowledges that the personal information displayed in fields (FIG. 5b, 450-454, 550-561) are correct, and will be submitted to the transaction facility (FIG. 5, 907) and in one manifestation the third party verifier (FIG. 6a, 930) for the purpose of verifying the user, client, and client data.

Clicking the submit button (FIG. 8b, 562) invokes the method or object to update the information displayed on the confirmation interface (FIG. 5, 905) and updates the corresponding data in tables (FIGS. 2, 40, 42, 43, 50, and 52) if any of the information had been modified. Further, the "userconfirmation" object (data from interface (FIG. 5, 905) creates an input data set to be passed to the third party verifier (FIG. 6a, 930). The data contained in the "userconfirmation" object is encrypted before transmission to the third party.

In one model manifestation, the third party verifier receives the above encrypted information over a network (FIG. 1a, 37). Conversely, the user may decide to select a postal mailing to send the data for verification and the transaction facility, and/or the third party verifier (FIG. 6a, 930).

If the user selects the online verification method, the third party verifier (FIG. 1a, 81) may display some additional questions which require knowledge of personal information that only the user possesses to confirm identity for that entity. Alternately, the transaction facility (FIG. 1a, 20) may make the final decision as to the accuracy of the data provided by the user on the data set provided by the third party verifier (FIG. 6a, 930).

As displayed in FIG. 8c, the verification result interface (FIG. 8c, 909) is displaying congratulatory (confirmation) text result (FIG. 8c, 910). Conversely, if there was an error in the verification process initiated by either bad data or failure to receive verification from the transaction facility (FIG. 5, 907) and/or the third party verifier (FIG. 6a, 930), the resultant interface (FIG. 8d, 911) would indicate that an error occurred, with suggestions on how to continue to remedy the situation.

FIG. 9 is a model manifestation of an RTC client Loan Officer Feedback webpage. Upon completion of an RTC transaction, the RTC client has an opportunity to give feedback for the parties involved. The illustrated example is for a real estate transaction (FIG. 9, 443). Included in this version is the Loan Officer's Name, (FIG. 9, 422), the Originating Lender Company's name, (FIG. 9, 402), a summary of the totals for the Loan Officer for various time periods, in this manifestation one month, one year, and lifetime (FIG. 9, 444), and similar feedback for the Originating Lender Company (FIG. 9, 445). It would be appreciated to note that different versions of feedback could exist for other objects and participants that weren't involved in physical real estate transactions.

Figure 10:
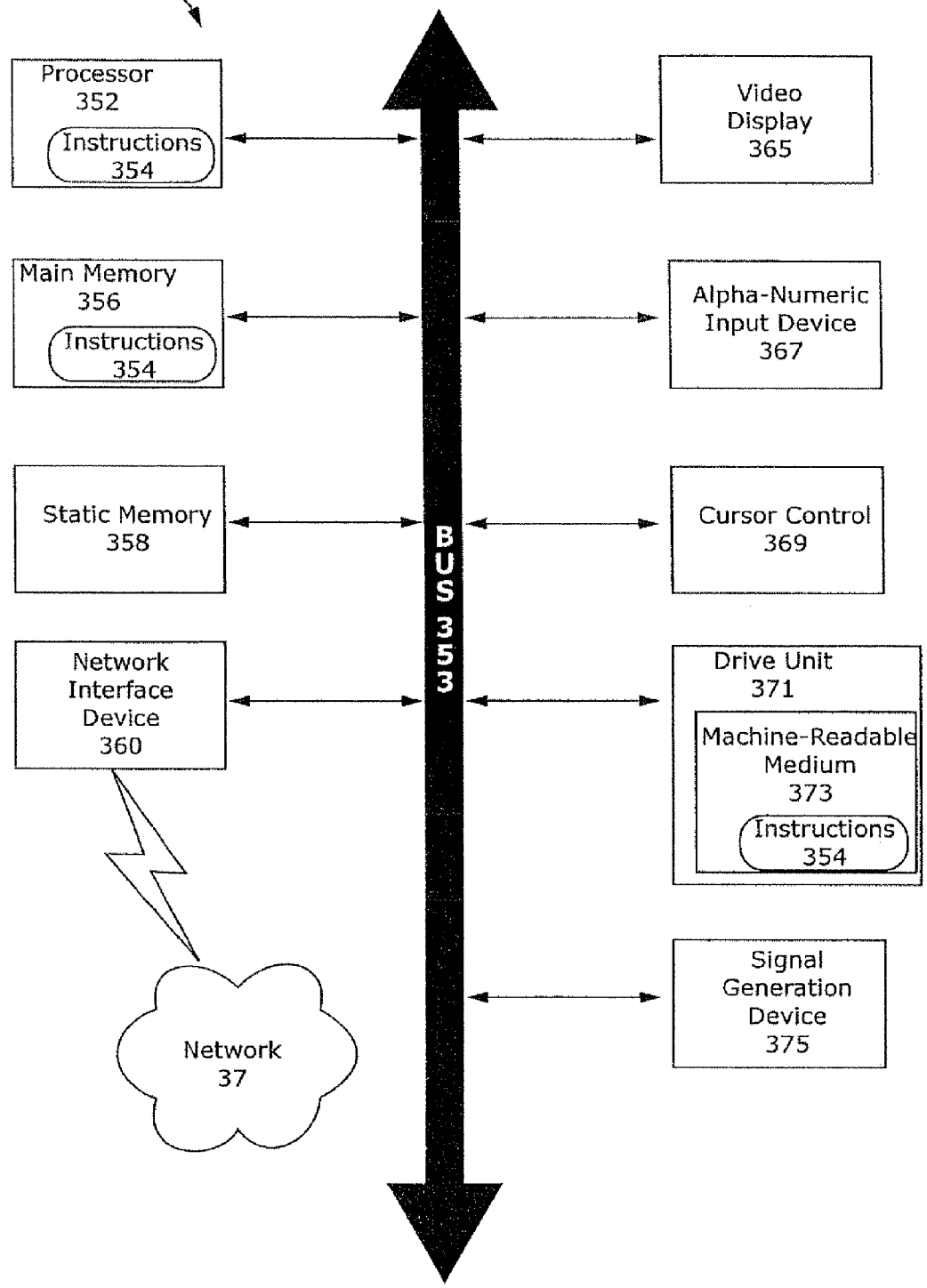
FIG. 10 is a block diagram of one manifestation of a computer system which may be used in the present invention.

FIG. 10 is a diagrammatic example of a current manifestation of a computer system. It will be readily understood by those versed in the craft of computer technology that rapid evolution of computer systems may render parts of this current diagram out of date. In alternate manifestations, other digital communication devices that can access the web and retrieve information, such as cell phones, Personal Digital Assistant (PDA's), and other possible future web appliances and devices will not be enumerated here though their construct of data flow and instruction sets are in many cases similar. The computer system (FIG. 10, 350) is capable of causing a set of instructions, including those discussed above, to be executed. The computer system consists of a central processing unit, CPU, (FIG. 10, 352) and the CPU instruction set (FIG. 10, 354), Random Access Memory (RAM or just plain memory) in one of its many varieties (FIG. 10, 356) and the memory's functional instruction set (FIG. 10, 354) which commutates to the processor via the bus (FIG. 10, 353). The computer system may include one of many incarnations of a video display (e.g. liquid crystal display—LCD, cathode tube—CRT, projector) for visual display of information processed by the computer system (FIG. 10, 365). It should be noted by those versed in computer technology that there are alternatives for information to be presented outside of audio, such as audio only for the visually impaired. The computer system also includes an Alpha-Numeric input device, commonly a keyboard, (FIG. 10, 367) again with the caveat that alternate input devices such as voice recognition units could be used in an alternate manifestation. The computer system also could contain a cursor control device, such as a mouse, trackball, touch screen, or pressure sensitive tablet (FIG. 10, 369), a disk drive unit (FIG. 10, 371) with it's machine-readable medium (e.g., hard drive, solid state memory devices such as a data key, SD Memory stick, etc) (FIG. 10, 373), disk drive, instruction set (FIG. 10, 354), signal generation device for audio (FIG. 10, 375). A means of communicating with the remote RTC Transaction facility (FIG. 1a, 20), via the Internet (FIG. 1a, 37) must also be present (FIG. 10, 360).

In consequence, a model manifestation of participating in a remote network based RTC transaction facility with independent third party verifications has been depicted. While the present invention has been depicted with reference to particular model manifestations, it will be evident that sundry variations and changes may be made to this model without departing from the broader intentions and scope of the invention. For that reason, the specifications and diagrams are to be regarded as instructive rather than restrictive.

What is claimed is:
1. The method of providing a prospective home buyer indicia indicative of independent verification of an approved loan amount comprising the steps of:
    providing a portal having access to automated underwriting capability for processing a loan application;
    accessing to the portal by a prospective home buyer;
    submitting information to the portal by said prospective home buyer, said information including the prospective home buyer's financial information required for processing a desired loan amount;
    independently verifying the information, including the financial information submitted by the prospective home buyer;
    underwriting, by a computer, the independently verified information provided by the prospective home buyer to determine whether the desired loan amount is approved;
    issuing indicia to the prospective home buyer upon approval of the desired loan amount, the indicia signifying that the submitted information has been independently verified for use by the prospective home buyer with prospective lenders and brokers, which said indicia is indicative of the fact that the desired loan amount is approved and that the loan is ready to close;
    storing the approved and ready to close loan amount at the portal; and accessing the portal by the prospective lenders and brokers, wherein the prospective lenders and brokers independently verify the approved and ready to close loan amount.

2. The method as defined in claim 1 wherein said indicia is a ready to close card for use by the prospective home buyer to show that the loan is ready to close.

3. The method as defined in claim 1 further comprising accessing said portal by sellers representatives to verify said approved and ready to close loan amount.

4. The method as defined in claim 1 further comprising accessing said portal by lenders to verify said approved and ready to close loan amount.

5. The method as defined in claim 1 wherein said processing step includes submitting said prospective home buyer information to an automated underwriting system (AUS).

6. The method of validating approval of a requested loan amount as defined in claim 1 further comprising providing access by a real estate lender to said database for said real estate lender to enter information relevant to said lenders identity and status into said database, verifying said real estate lenders information, and granting access by the real estate lender to said system for said lender to verify the prospective home buyer's approved ready to close loan amount.

7. The method of claim 1 wherein the step of independently verifying said home buyer information comprises submitting said information to a third party.

8. The method of claim 7 which further includes said third party transferring information to said portal of independent verification of said prospective home buyer's information.

9. The method of validating approval of a real estate transaction including a requested loan amount comprising:
  (A) providing an internet based computer system for use in real estate financing verification;
  (B) creating a computer database for use in generating an indicia indicative of a prospective real estate purchaser having an approved ready to close loan;
  (C) accessing said computer database by said prospective real estate purchaser to enter information relevant to said prospective real estate purchaser's ability to pay the requested loan amount into said computer database;
  (D) submitting said information to an independent third party for independent verification;
  (E) underwriting, by a computer, said information to determine whether a loan amount requested by said prospective real estate purchaser is approved;
  (F) issuing said indicia upon approval of the requested loan amount to the prospective real estate purchaser, for use by said prospective purchaser with prospective lenders and brokers, which said indicia is indicative that said requested loan amount is approved and ready to close; and
  (G) accessing said computer database by a real estate seller to enter information relevant to said real estate seller's identity, status, and the real estate for sale, into said computer database, verifying said seller's information, and granting the real estate seller access to said computer database to review the prospective real estate buyer's approved ready to close loan.

* * * * *